United States Patent Office 2,880,134
Patented Mar. 31, 1959

2,880,134

METHOD OF TISSUE FILLING

Hillary Robinette, Jr., Philadelphia, Pa.

No Drawing. Application June 21, 1955
Serial No. 517,065

5 Claims. (Cl. 167—49.5)

This invention relates to compositions and methods of using such compositions in the treatment of corpses to improve their appearance in those cases where it is necessary or desirable to build up the tissue or body at any particular point or area.

It is well known that bodies of human beings after death in many instances are emaciated. Even before death the person may be emaciated and in such instances, after death, the emaciation is very much more pronounced. The condition varies depending largely upon the sickness from which death results.

It is the aim of embalmers in preparing a body and laying it out, to have it present as natural an appearance as possible and to accomplish the result it is necessary to cause the emaciated tissue to be rebuilt in some manner so as to not distort the features any more than possible.

While various methods and compositions have been suggested in the prior art, these have in general not been satisfactory in not giving the control in use that is necesary and in some cases lacking the flexibility for utilization in the best manner; cost also in some cases being excessive.

Among the objects of the present invention is included compositions that may be used as tissue fillers which on contact with gelling agents result in the production of pliable bodies in situ in body areas which may be molded into desired shape or contour before any setting or solidification to nonpliability has taken place.

Other objects include methods for utilization of such compositions.

Further objects include the products resulting from such gelling operations particularly in the shape of molded articles designed to build up the appearance of the corpse and for other purposes.

Still further objects and advantages of the present invention will appear from the more detailed description set forth below, it being understood that such more detailed description is given by way of illustration only and not by way of limitation since various changes therein may be made by those skilled in the art without departing from the scope and spirit of the present invention.

In accordance with the present invention, a solution is provided which when injected by any siutable device such as a hypodermic syringe, will, in contact with the embalming fluids circulated thorugh the body in the normal proecdure for embalming, cause the tissues to stand out firmly. Such improved solutions may desirably be made by dissolving, in dilute acetic acid, or other dilute acid, deacetylated chitin. Dilute solutions of deacetylated chitin when contacted with an aldehyde, such as formaldehyde, normally used in embalming fluid form a firm solid jell structure. This solidifying solution, when injected hypodermically into dead bodies of humans will in contact with the embalming fluids, solidify and produce firm tissues.

In treating a body it is well known that after extracting the blood the water in the body will settle to the back and it is the aim to inject the solution before the water really drains to the back of the body. If it is found that the water has drained to the back before the solution is injected, it is not necessary to be unduly concerned since when the body is embalmed with the formaldehyde solution it will contact the deacetylated chitin solution previously injected hypodermically into the emaciated areas and cause such areas to become firm. During the period while the acidic deacetylated chitin solution is being contacted by the formaldehyde it is possible to mold the expanded tissues in such a manner as to create a desirable appearance. Such molded tissues will retain the structure as the formaldehyde continues to solidify and crosslink the previously injected deacetylated chitin. In using this solution in dead bodies of humans it is obvious that formaldehyde solutions or embalming fluids may be injected into the flesh tissues either before or simultaneously with the injection of the solution, or subsequently thereto, in order to cause immediate or simultaneous solidification or gelation of the solution. In injecting fluids directly simultaneously with the solution it is possible to use a double hypodermic needle.

The deacetylated chitin suitable for use for preparing tissue fillers is properly classified as a nondegraded deacetylated chitin. It exists in a variety of forms depending on the extent of the nitrogen as free amino groups and also in various conditions which markedly affect its viscosity and so on. As a general rule, all of the acetyl groups are not removed from chitin although a large part of them are removed. Thus from 70% to 90% of the nitrogen appears as free amino groups with the proportions of 80% to 90% preferred in the material particularly useful in accordance with the present invention. The viscosity of the at least partially deacetylated chitin solution which is used may vary substantially, as for example, from about 1 to 1,000 centiposises with a preferred range in the order of 5 to 20 centipoises. The viscosity whenever referred to herein is that obtained when measured on a .25% solution of the deacetylated chitin in .25% aqueous acetic acid at 25° C. The viscosity as indicated is a variant which may be controlled as desired, particularly in the materials which contain 70% to 90% of nitrogen in the form of free amino groups. The chitin solution most desirably empolyed for present purposes is one whose relative viscosity (measured as set forth immediately above) to glycerol is 2½ to 50 times that of glycerol (.25% solution of glycerine) at 27.5° C.

At least partially deacetylated chitin as referred to above is readily soluble in a variety of acids to produce solutions of varying concentrations in any order desired. Concentrations of from .5 to 50% and higher are readily produced. In accordance with the present invention such high concentrations will never be necessary and modest concentrations of the order of from about 2 to 10% of the water soluble acid salt of the at least partially deacetylated, substantially un-degraded chitin may be employed. For the production of such water soluble salts a wide variety of acids may be used. One of the most readily available and easily employed is acetic acid which readily produces the corresponding acetate from deacetylated chitin, which acetate is readily soluble in water or acetic acid.

The examples given below illustrate the use of acetic acid for these purposes, it being understood, however, that a wide variety of other acids may be employed. Among the acids which may be utilized in producing such derivatives are the monobasic aliphatic acids such as acetic, propionic, isobutyric, and the like; various substituted acids containing alkyl groups, hydroxyl groups, unsaturated groups, the acids including glycolic acid, lactic acid, and citric acid; and inorganic acids also may be used to produce the salts such as phosphoric, hydrochloric and sulfuric acids.

Any of the water soluble salts of at least partially deacetylated chitin may be used or acid solutions of such chitin materials, but particularly the solutions should contain components that do not materially discolor or give any other undesirable effects during the period before burial. The reaction product formed with the gelling agent is desirably one that is pliable so that it may be shaped or molded into the desired form or contour. Further reaction may ultimately take place to give a set product after the shaping or molding operation. In some cases where body cavities or emaciated areas are to be filled or built up in non-visible positions, a preformed shaped article may be made and inserted into position or a combination of the stated techniques may be employed.

While formaldehyde has been employed above to illustrate gelling agents, other gelling agents may be used. These include aldehydes generally such as glyoxal, acetaldehyde, furfural, and other water-soluble, or water-alcohol soluble aldehydes. Since the acid salts of deacetylated chitin are cationic in nature, quaternary salts are compatible with them, and such quaternaries may be used in embalming fluids without any adverse effect on the reaction of the gelling agent (particularly aldehydes) with the deacetylated chitin. Such quaternaries include materials which themselves have preserving and disinfecting characteristics. Exemplary compositions include those at least once substituted by a higher or long chain aliphatic radical, the remaining substituents being short chain alkyls, cyclo-alkyls, aralkyl, aryl, etc.; representative compounds being dimethyldecyl-benzyl ammonium chloride, dipropyl-phenylethyl-dodecyl ammonium bromide, etc., as well as lauryl dimethyl benzyl ammonium chloride, lauryl trimethyl ammonium bromide, etc.

Where the sole embalming agent is a non-aldehyde containing composition, it is desirable to use compositions of the present invention along with dilute formaldehyde solutions injected concurrently to give filler products referred to herein. Other components in embalming fluids may also have a coagulating effect on acidic deacetylated chitin solutions, for example polyvalent inorganic ions usually present in such compositions, will act in this way; borax which is a common ingredient of many arterial fluids will coagulate deacetylated chitin.

The following examples will illustrate the invention, parts being by weight unless otherwise indicated.

I

An acid solution of deacetylated chitin suitable for use in accordance with the present application is prepared as follows: 5 parts of deacetylated chitin are dissolved in 5 parts of glacial acetic acid in 90 parts of water. This solution has a viscosity of 13.1 centipoises when diluted to a .25% solids.

Injection of this solution hypodermically in emaciated areas of human tissue prior to arterially embalming imparts to the emaciated tissue, after being contacted with the formaldehyde of the embalming solution, a firm moldable substance which materially improved the appearance of the corpse.

The example given above illustrates a 5% solution. Concentrations of from 2 to about 10% deacetylated chitin solids are desirably used for injection purposes. Solutions containing less than 2% do not generally give adequate gel strength for use as a tissue filler. Solutions containing 10% are generally too viscous to inject hypodermically. A 5% solution has most desirable properties from the standpoint of ease of injection and firmness of tissue. However, it should be kept in mind that viscosities may be affected by nature of solvent and other factors so that injectable solutions may be used having concentrations other than those set forth above.

II 5 parts of deacetylated chitin are dissolved in 95 parts of a 5% aqueous solution of citric acid. Injection of this solution hypodermically, in emaciated areas of human tissue prior to arterial embalming, imparts to the emaciated tissue, after being contacted with the formaldehyde of the embalming solution, a firm moldable substance which materially improves the appearance of the corpse.

III

This example is identical with Example II except that the acid used is a 5% aqueous solution of phosphoric acid.

Having thus set forth my invention, I claim:

1. A method of tissue filling in a corpse which consists essentially in contacting a water soluble salt of at least partially deacetylated chitin within an area to be filled with a gelling agent for the chitin component to form a pliable tissue filler in situ, the chitin salt solution being injected into the corpse, and the gelling agent being an embalming fluid.

2. A method as set forth in claim 1 in which the at least partially deacetylated chitin in solution gives a viscosity of the order of 5 to 20 centipoises and a nitrogen content of about 70% to 90% by weight in the form of free amino groups.

3. A method as set forth in claim 2 in which the solution is of the order of about 2 to 10% concentration of an acetic acid salt of at least partially deacetylated substantially undegraded chitin.

4. The method of tissue filling in corpses consisting essentially of contacting an aqueous solution of at least partially deacetylated chitin in a dilute tissue building acid component forming a water soluble salt with the chitin component within tissue to be filled, with an embalming fluid that contains a component that gels the chitin component to form a pliable tissue filler in situ in the tissue.

5. The method as set forth in claim 4 in which the at least partially deacetylated chitin in solution gives a viscosity of the order of from 5 to 20 centipoises and a nitrogen content of about 70 to 90% by weight in the form of free amino groups.

References Cited in the file of this patent

UNITED STATES PATENTS

| Re. 19,099 | Haabestad | Mar. 6, 1934 |
| 2,108,181 | Schummer et al. | Feb. 15, 1938 |
| 2,352,099 | Hobdell | June 20, 1944 |

FOREIGN PATENTS

| 458,813 | Great Britain | Dec. 21, 1936 |